United States Patent
Zhu et al.

(10) Patent No.: US 10,331,138 B2
(45) Date of Patent: Jun. 25, 2019

(54) STANDARD SCENE-BASED PLANNING CONTROL METHODS FOR OPERATING AUTONOMOUS VEHICLES

(71) Applicant: Baidu USA LLC, Sunnyvale, CA (US)

(72) Inventors: Fan Zhu, Sunnyvale, CA (US); Qi Kong, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 69 days.

(21) Appl. No.: 15/202,542

(22) Filed: Jul. 5, 2016

(65) Prior Publication Data

US 2018/0011494 A1 Jan. 11, 2018

(51) Int. Cl.
| | |
|---|---|
| *G01C 22/00* | (2006.01) |
| *G05D 1/00* | (2006.01) |
| *G05D 1/02* | (2006.01) |
| *B60W 10/04* | (2006.01) |
| *B60W 10/18* | (2012.01) |
| *B60W 10/20* | (2006.01) |
| *B60W 30/18* | (2012.01) |

(52) U.S. Cl.
CPC .......... *G05D 1/0212* (2013.01); *B60W 10/04* (2013.01); *B60W 10/18* (2013.01); *B60W 10/20* (2013.01); *B60W 30/18* (2013.01); *G05D 1/0088* (2013.01); *G05D 1/0221* (2013.01); *B60W 2560/00* (2013.01); *B60W 2710/0605* (2013.01); *B60W 2710/18* (2013.01); *B60W 2710/20* (2013.01)

(58) Field of Classification Search
CPC .. G05D 1/0212; G05D 1/0088; G05D 1/0221; B60W 10/04; B60W 10/18; B60W 10/20; B60W 30/18
USPC ........................................................ 701/26
See application file for complete search history.

(56) References Cited

U.S. PATENT DOCUMENTS

| | | | |
|---|---|---|---|
| 6,092,010 A * | 7/2000 | Alofs .................... | G05D 1/0274 180/167 |
| 9,480,534 B2 * | 11/2016 | Bowling .................. | B25J 13/00 |
| 9,507,346 B1 * | 11/2016 | Levinson ............. | G05D 1/0214 |
| 9,532,849 B2 * | 1/2017 | Anderson .............. | A61B 90/57 |
| 9,820,818 B2 * | 11/2017 | Malackowski ........ | A61B 34/32 |
| 9,953,535 B1 * | 4/2018 | Canavor ................ | H04W 4/70 |
| 2011/0264136 A1 * | 10/2011 | Choi ...................... | A61B 34/71 606/205 |

(Continued)

*Primary Examiner* — Harry Y Oh
(74) *Attorney, Agent, or Firm* — Womble Bond Dickinson (US) LLP

(57) ABSTRACT

In one embodiment, motion planning and control data is received, where the motion planning and control data indicates that an autonomous vehicle is to move from a first point to a second point of a path within a predetermined route. In response to the motion planning and control data, the path from the first point to the second point is segmented into multiple path segments. For each of the path segments, one of predetermined driving scenes is identified that matches motion characteristics of the corresponding path segment. The motion planning and control data associated with the path segments is modified based on predetermined motion settings of the path segments. The autonomous vehicle is driven through the path segments of the path based on the modified motion planning and control data.

21 Claims, 8 Drawing Sheets

(56) References Cited

U.S. PATENT DOCUMENTS

| | | | | |
|---|---|---|---|---|
| 2013/0211423 A1* | 8/2013 | Blumenkranz | A61B 17/3462 | 606/130 |
| 2013/0245945 A1* | 9/2013 | Morita | G08G 1/096716 | 701/533 |
| 2013/0345718 A1* | 12/2013 | Crawford | A61B 17/025 | 606/130 |
| 2014/0236177 A1* | 8/2014 | Verner | A61B 17/3462 | 606/130 |
| 2015/0345966 A1* | 12/2015 | Meuleau | G01C 21/3453 | 701/23 |
| 2015/0366620 A1* | 12/2015 | Cameron | A61B 17/3421 | 606/130 |
| 2016/0001448 A1* | 1/2016 | Rothfuss | A61B 34/30 | 294/192 |
| 2016/0171885 A1* | 6/2016 | Lynch | G08G 1/0129 | 701/117 |
| 2017/0010613 A1* | 1/2017 | Fukumoto | G08G 1/096827 | |
| 2017/0049522 A1* | 2/2017 | Kapadia | A61B 34/30 | |
| 2017/0123421 A1* | 5/2017 | Kentley | G01C 21/26 | |
| 2017/0123429 A1* | 5/2017 | Levinson | G05D 1/0088 | |
| 2017/0191834 A1* | 7/2017 | Fowe | G01C 21/10 | |
| 2017/0336801 A1* | 11/2017 | Shashua | G01C 21/32 | |

\* cited by examiner

| Driving Scene 501 | Driving Parameters 502 |
|---|---|
| Decelerate from 50 mph to 40 mph in 100 meters | ... |
| Maintain speed at 40 mph in 100 meters | ... |
| Accelerate from 40 mph to 50 mph and change to right lane in 100 meters | ... |
| ... | ... |

FIG. 5

STANDARD SCENE-BASED PLANNING CONTROL METHODS FOR OPERATING AUTONOMOUS VEHICLES

FIELD OF THE INVENTION

Embodiments of the present invention relate generally to operating autonomous vehicles. More particularly, embodiments of the invention relate to scene-based planning control methods for operating autonomous vehicles.

BACKGROUND

Some vehicles can operate partially or fully autonomously. Vehicles operating in an autonomous mode (e.g., driverless) can relieve occupants, especially the driver, from some driving-related responsibilities. When operating in an autonomous mode, some or all of the driving aspects of the vehicle can be handled by a vehicle control system. A data processing system coupled to the vehicle control system may be utilized to carry out certain functionalities, such as planning a driving route or path, sensing the environment surrounding the vehicle, and controlling other driving components (e.g., steering, throttle, and braking systems). Thus, an autonomous vehicle can navigate to various locations using onboard sensors, allowing the vehicle to travel with minimal human interaction or in some cases without any passengers.

Motion planning and control is a critical operation in autonomous driving. However, an autonomous vehicle is not as smooth as the one driven by a human driver. On the other hand, as the number of conditions to be controlled is increasing, it is not feasible to record human drivers' driving response in all scenarios. In many cases, passengers of an autonomous vehicle could be car sick due to the unsmooth acceleration, deceleration, or turnings. There has been a lack of efficient ways to compensate such defects.

BRIEF DESCRIPTION OF THE DRAWINGS

Embodiments of the invention are illustrated by way of example and not limitation in the figures of the accompanying drawings in which like references indicate similar elements.

FIG. 5 is a block diagram illustrating an example of a driving scene database according to one embodiment of the invention.

DETAILED DESCRIPTION

Figure 1:
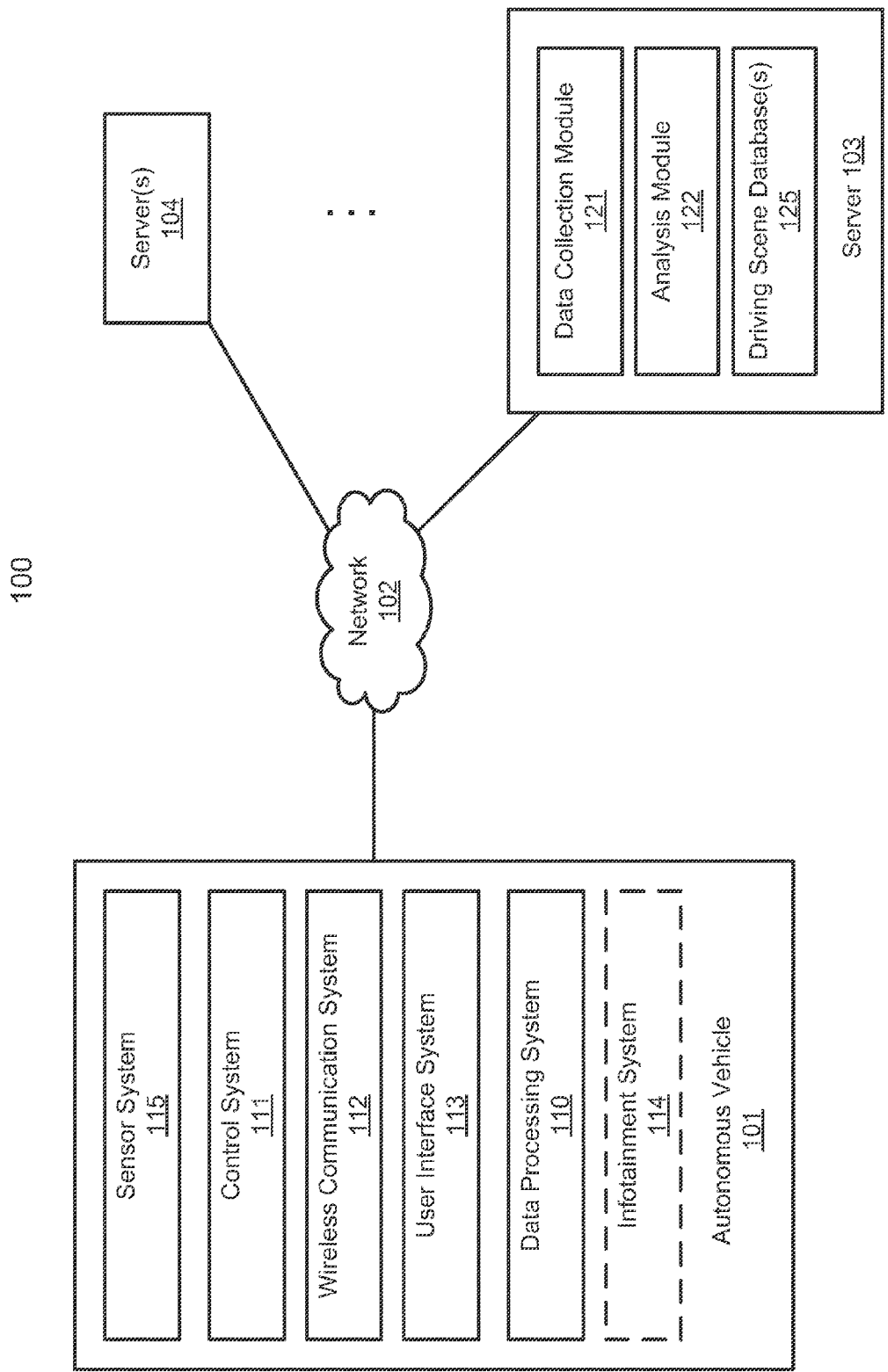
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, driving behaviors of a variety of human drivers are captured and recorded for certain predefined driving scenes or driving scenarios. The driving behaviors of the human drivers may be captured and recorded in a variety of types of models of vehicles. The driving behaviors may include throttle behaviors, braking behaviors, and/or steering behaviors, etc., which may be captured using a variety of sensors (e.g., throttle sensors, steering sensors, speed sensors, braking sensors). A driving scene database is built according to different predefined driving scenes to store the driving behaviors corresponding to the predefined driving scenes. The driving behaviors may be represented by the controlling settings of the vehicles such as, throttle settings or commands, braking settings or commands, steering settings or commands, etc., referred to as driving parameters.

The database may be built, for example, by a data analytics system or server offline, based on the driving behaviors of a large amount of different human drivers, such that the recorded driving behaviors can represent the driving behaviors or habits of an average human driver. The driving scene database is a vehicle specific database, i.e., constructed based on human drivers' behaviors for that particular type or model of the vehicles. The driving scene database is then loaded and stored in a storage device within an autonomous vehicle of the corresponding type or model.

During the real-time autonomous driving of an autonomous vehicle, according to one embodiment, when a driving route has been planned, for example, by a planning and control module of the autonomous vehicle, the planned route is analyzed to segment a particular path of the route into one or more path segments. The segmentation of a path or route may be performed using a predetermined segmentation algorithm. For each of the path segments, a search is performed in the driving scene database to find a corresponding driving scene that matches the path segment, for example, based on metadata of the corresponding path segment provided by the planning and control module of a vehicle control system. If there is a matching driving scene found, the corresponding driving parameters associated with the matching driving scene are utilized to control the autonomous vehicle to move within the corresponding path segment, instead of the driving parameters determined by the control system at runtime. Since the predefined driving parameters are determined based on actual human drivers' behaviors under the same or similar circumstances, the autonomous driving through the corresponding path segment is close to what a human driver would behave. As a result, a passenger riding the autonomous vehicle would have the same or similar feelings as of the actual human driving, which may reduce the possible uncomfortable feelings due to autonomous driving.

FIG. 1 is a block diagram illustrating an autonomous vehicle network configuration according to one embodiment of the invention. Referring to FIG. 1, network configuration 100 includes autonomous vehicle 101 communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (POI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, data processing system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or data processing system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
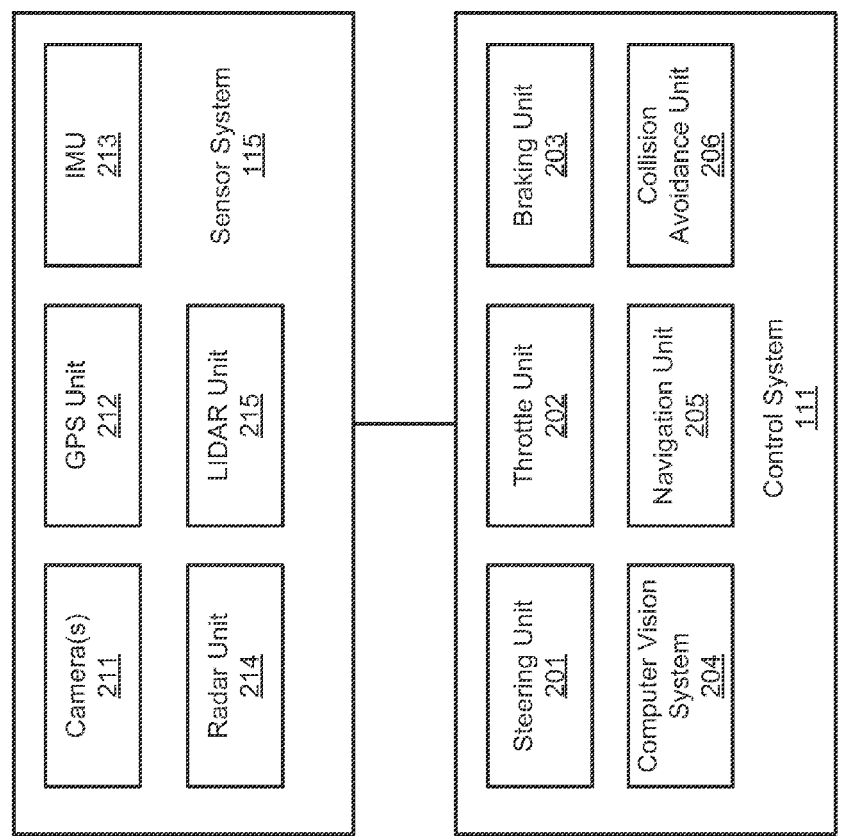
FIG. 2 is a block diagram illustrating an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), braking unit 203, computer vision system 204, navigation unit 205 (also referred to as a navigation and pathing or navigation/pathing system), and collision avoidance unit 206 (also referred to as an obstacle avoidance system). Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle.

Computer vision unit or system 204 is to process and analyze images captured by one or more cameras 211 in order to identify objects and/or features in the environment of autonomous vehicle. The objects can include traffic signals, road way boundaries, other vehicles, pedestrians, and/or obstacles, etc. Computer vision system 204 may use an object recognition algorithm, video tracking, and other computer vision techniques. In some embodiments, computer vision system 204 can map an environment, track objects, and estimate the speed of objects, etc.

Navigation unit or system 205 is to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via a user interface. Navigation system 205 may update the driving path dynamically while the autonomous vehicle is in operation. Navigation system 205 can incorporate data from a GPS system and one or more maps so as to determine the driving path for the autonomous vehicle.

Collision avoidance unit or system 206 is to identify, evaluate, and avoid or otherwise negotiate potential obstacles in the environment of the autonomous vehicle. For example, collision avoidance system 206 may effect changes in the navigation of the autonomous vehicle by operating one or more subsystems in the control system to undertake swerving maneuvers, turning maneuvers, braking maneuvers, etc. Collision avoidance system 206 may automatically determine feasible obstacle avoidance maneuvers on the basis of surrounding traffic patterns, road conditions, etc. Collision avoidance system 206 may be configured such that a swerving maneuver is not undertaken when other sensor systems detect vehicles, construction barriers, etc. in the region adjacent the autonomous vehicle that would be swerved into. Collision avoidance system 206 may automatically select the maneuver that is both available and maximizes safety of occupants of the autonomous vehicle. Collision avoidance system 206 may select an avoidance maneuver predicted to cause the least amount of acceleration in a passenger cabin of the autonomous vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some of all of the functions of autonomous vehicle 101 may be controlled or managed by data processing system 110, especially when operating in an autonomous driving mode. Data processing system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, data processing system 110 may be integrated with vehicle control system 111.

For example, a user as a passenger may specify a starting location and a destination of a trip, for example, via a user interface. Data processing system 110 communicates with other components of autonomous vehicle 101 to obtain the trip related data. For example, data processing system 110 may obtain location and route information from a location server and a map and POI (MPOI) server, which may be a part of servers 103-104. The location server provides location services and MPOI server 105 provides map services and the POIs of certain locations. Alternatively, such location and MPOI information may be cached locally in a persistent storage device of data processing system 110.

During traveling of autonomous vehicle 101 along the route, data processing system 110 may also obtain real-time traffic information from a traffic information system or server (TIS). Note that servers 103-104 may be operated by a third party entity. Alternatively, the functionalities of servers 103-104 may be integrated with data processing system 110. Based on the real-time traffic information, MPOI information, and location information, as well as real-time local environment data detected or sensed by sensor system 115 (e.g., obstacles, objects, nearby vehicles), data processing system 110 can plan an optimal route and drive vehicle 101, for example, via control system 111, according to the planned route to reach the specified destination safely and efficiently.

According to one embodiment, autonomous vehicle 101 further includes infotainment system 114 to provide information and entertainment to passengers of vehicle 101. The information and entertainment content may be received, compiled, and rendered based on content information stored locally and/or remotely (e.g., provided by servers 103-104). For example, the information may be streamed in real-time from any of servers 103-104 over network 102 and displayed on a display device of vehicle 101. The information may be augmented with local information captured in real-time, for example, by one or more cameras and the augmented content can then be displayed in a virtual reality manner.

In an autonomous vehicle, there may be no actual or physical window. Rather, a "window" (referred to herein as a virtual window) may be represented or replaced by a display device, i.e., a flat or curved screen display device molded into a shape of a vehicle window, optionally with a touch screen. The display device would display images or stream of images (e.g., video) that are captured dynamically in real-time by an appropriate camera or cameras, as if the user were watching or viewing the actual physical content through a see-through window. For each of the "windows" (e.g., display devices), there is a corresponding display channel to stream the corresponding content to be displayed at real-time, which may be centrally processed by an augmenting reality system, e.g., infotainment system 114 and/or data processing system 110. In such situation, an augmented image is displayed in a virtual reality manner via infotainment system 114, also referred to as an augmented reality manner.

For example, a content item received from a content database or from a remote content provider or content server may be superimposed onto an image captured locally by a camera to become an augmented image. The augmented image is then displayed on a display device within autonomous vehicle 101. The display device may be configured to appear as an ordinary window of a vehicle. When a user looks at the display device, the object of the image is displayed as a virtual object in a virtual reality manner as if the user looked at the physical object through an ordinary window of the vehicle. The display device may display a stream of augmented images (e.g., augmented video) in real time, which is similar or simulates an augmented reality (AR) environment.

In one embodiment, based on location and route information, MPOI information, and/or real-time traffic information, infotainment system 114 and/or data processing system 110 determines certain types of content that are suitable for the current traffic environment (e.g., MPOIs). The system performs a lookup operation in a content index (not shown) to identify a list content items (e.g., sponsored content or Ads) as content item candidates, for example, based on the real-time traveling information.

In one embodiment, the system ranks the content items in the list using a variety of ranking algorithm. The content items may be ranked based on a user profile of the user. For example, the content items may be ranked based on user preferences, which may be derived from the user profile. The user profile may be compiled based on a history of user operations of the user in the past. In one embodiment, the system applies one or more content ranking models to each of the content items to determine a ranking score for each content item. A content item having a ranking score that is above a predetermined threshold may be selected. The content ranking models may be trained using sets of known features representing similar traveling environments or traffic conditions in the past. The content ranking models may also be trained based on user profiles of similar users.

The selected content item is then rendered and displayed on a display device within the autonomous vehicle. In one embodiment, the system further augments the selected content item onto an image that is captured at the point in time using one or more cameras of the autonomous vehicle. In one embodiment, an image recognition is performed on the image and to derive or understanding the content represented by the image. For example, one or more keywords may be derived to describe the image or a POI. The list of content items may be identified further based on the one or more keywords or the POI represented by the image. The system then augments the selected content item onto the image generate an augmented image, where the content item may be superimposed on the image. The augmented image is then displayed on a display device of the autonomous vehicle. Note that infotainment system 114 may be integrated with data processing system 110 according to some embodiments.

Alternatively, a user can specifically select from a list of precompiled content (e.g., videos, movies) from a content store or database, which may be periodically updated from a content server of a content provider over a network (e.g., cloud network). Thus, a user can specifically select the real-time actual content captured in real-time or previously rendered content to be displayed on the display device(s), for example, retrieved from data store 125. For example, if autonomous vehicle 101 is traveling in a snowy day in New York City, the user can switch the display devices to display a sunny environment in Hawaii as if autonomous vehicle 101 was traveling on a sunny day. The content may displayed in multiple display devices (e.g., multiple windows) in a collaborated or coordinated manner, i.e., virtual reality manner.

Referring back to FIG. 1, according to one embodiment, driving behaviors of a variety of human drivers of a variety of vehicles are captured and recorded for certain predefined driving scenes or driving scenarios. A driving scenario can be, for example, accelerating 5 mile per hour (mph) in 100 meters, then maintaining the speed and driving 100 meters, then decelerating 10 mph in 100 meters, then merging onto the right lane in 100 meters at 40 mph, then merging onto the right lane in 50 meters at 20 mph, then merging onto the left lane in 100 meters at 40 mph, and then merging onto the left lane in 50 meters at 20 mph, etc.

The driving behaviors of driving scenes are collected from the vehicles by data collection module 121 of data analytics system or server 103. The driving behaviors of the human drivers may be captured and recorded in a variety of types of models of vehicles. The driving behaviors may include throttle behaviors, braking behaviors, and/or steering behaviors, etc., which may be captured using a variety of sensors (e.g., throttle sensors, steering sensors, speed sensors, braking sensors). A driving scene database is built according to different predefined driving scenes to store the driving behaviors corresponding to the predefined driving scenes. The driving behaviors may be represented by the controlling settings or driving parameters of the vehicles such as, throttle settings or commands, braking settings or commands, steering settings or commands, etc.

The driving behaviors are analyzed by analysis module 122 and driving scene database 125 may be built offline based on the driving behaviors of a large amount of different human drivers, such that the recorded driving behaviors can represent the driving behaviors or habits of an average human driver driving the same or similar type or model of vehicles. The driving scene database 125 is a vehicle specific database, i.e., constructed based on human drivers' behaviors for that particular type or model of the vehicles. The driving scene database 125 is then loaded and stored in a storage device within autonomous vehicles of the corresponding type or model, such as autonomous vehicle 101.

Figure 3:
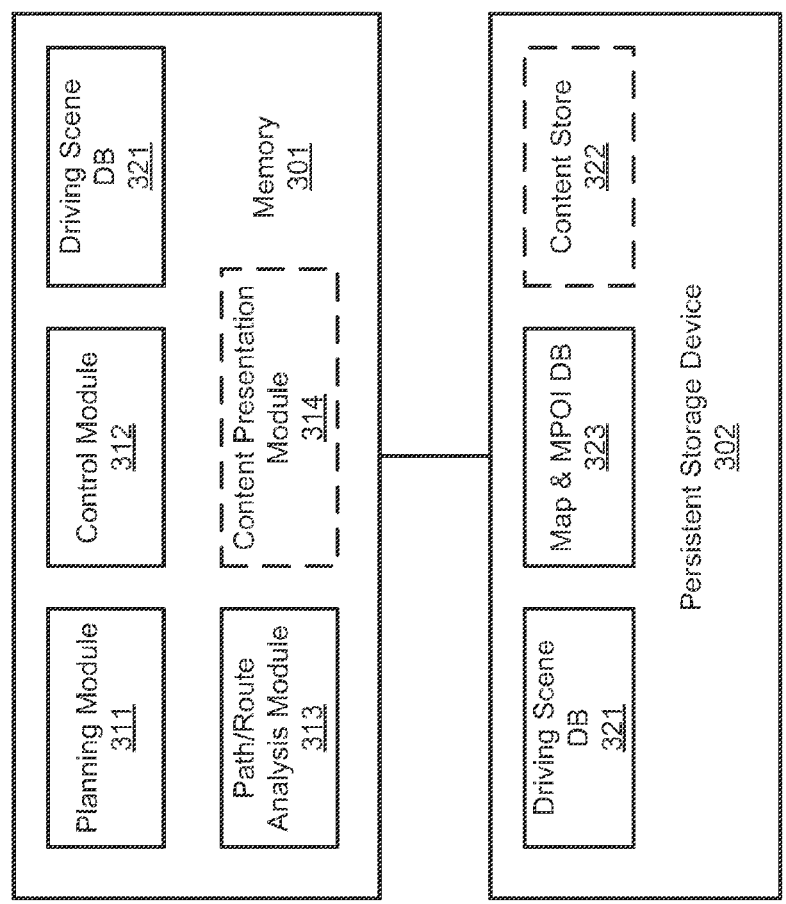
FIG. 3 is a block diagram illustrating a data processing system that can be utilized with an autonomous vehicle according to one embodiment of the invention.

FIG. 3 is a block diagram illustrating a data processing system that may be utilized with an autonomous vehicle according to one embodiment. System 300 may be implemented as part of data processing system 110 of FIG. 1. Referring to FIG. 3, system 300 includes motion planning module 311, motion control module 312, path/route analysis module 313, and optional content presentation module 314. These modules can be implemented in software hardware, or a combination thereof. For example, modules 311-314 may be loaded in memory 301 and executed by one or more processors (not shown). Planning module 311 is to plan a path or route for the autonomous vehicle based on a variety information, such as, sensor data received from sensor system 115 and/or real-time information received from a variety of sources (e.g., location, map, POI). The planning and control data is generated by planning module 311. Based on the planning and control data control module 312 is to control the vehicle, by sending proper commands or signals to vehicle control system 111, according to a route or path defined by the planning and control data. The planning and control data include sufficient information to drive the vehicle from a first point to a second point of a route or path using certain appropriate vehicle settings or driving parameters (e.g., throttle, braking, and turning commands) at different points in time along the path or route. Note that planning module 311 and control module 312 may be communicatively coupled to or integrated with navigation unit 205 of vehicle control system 111 of FIG. 2.

According to one embodiment, when the planning and control data of a path along a route is generated by planning module 311, path/route analysis module 313 (also known as "path analysis module") is invoked to perform an analysis on the planning and control data. Path/route analysis module 313 segments the path into multiple path segments based on the path metadata as part of the planning and control data. The path may be segmented using a predetermined path segmentation algorithm, for example, based on the characteristics or driving parameters of different portions of the path. The path metadata may describe how the vehicle should be driven at different points in time along the path by specifying the related driving parameters or settings at different points in time. The driving parameters or settings may include, but are not limited to, speed, acceleration or throttle, deceleration, direction or turning angle, braking parameters, etc. Path/route analysis module 313 may recognize the changes of driving scenarios along the path based on the changes of the above driving parameters.

For each of the path segments, path/route analysis module 313 performs a lookup operation in driving scene database 321 to identify a driving scene that matches the driving characteristics of the path segment (e.g., same or similar speed, acceleration, deceleration, direction, turning angle, and/or braking). Driving scene database 321 may be configured previously by a data analytics system (e.g., data analytics system or server 103 of FIG. 1) offline, stored in persistent storage device 302, and loaded into memory 301 at runtime.

In one embodiment, driving scene database 321 includes a number of entries, each entry mapping a particular driving scene to a set of one or more driving parameters or settings. The driving scenes listed in driving scene database 321 may be those that commonly occur. The driving parameters or settings for the driving scenes may be identified based on the behaviors of a large number of human drivers driving the same or similar type or model of vehicles. Note that driving scene database 321 is a per vehicle-based database and was created specifically for the type or model of the specific vehicle. Different types or models of vehicles may have different driving scene databases containing different driving scenes and their respective driving parameters.

If there is a matching entry existed, in one embodiment, at least a portion of the driving parameters or settings stored in the matching entry of driving scene database 321 may be utilized to replace or modify the driving parameters or settings corresponding to the path segment provided by planning module 311. In one embodiment, if there is no matching entry found, the driving parameters or settings produced by planning module 311 may be utilized for that particular path segment. Thereafter, control module 312 then issues commands to control system 111 at different points in time along the path to drive the vehicle according to the modified driving parameters or settings. Since the predefined vehicle settings or control parameters are determined based on actual human drivers' behaviors under the same or similar circumstances, the autonomous driving through the corresponding path segment is close to or mimics what a human driver would behave under the circumstances. As a result, a passenger ridding the autonomous vehicle would have the same or similar feelings as of the actual human driving, which may reduce the possible uncomfortable feelings due to autonomous driving.

Figure 4:
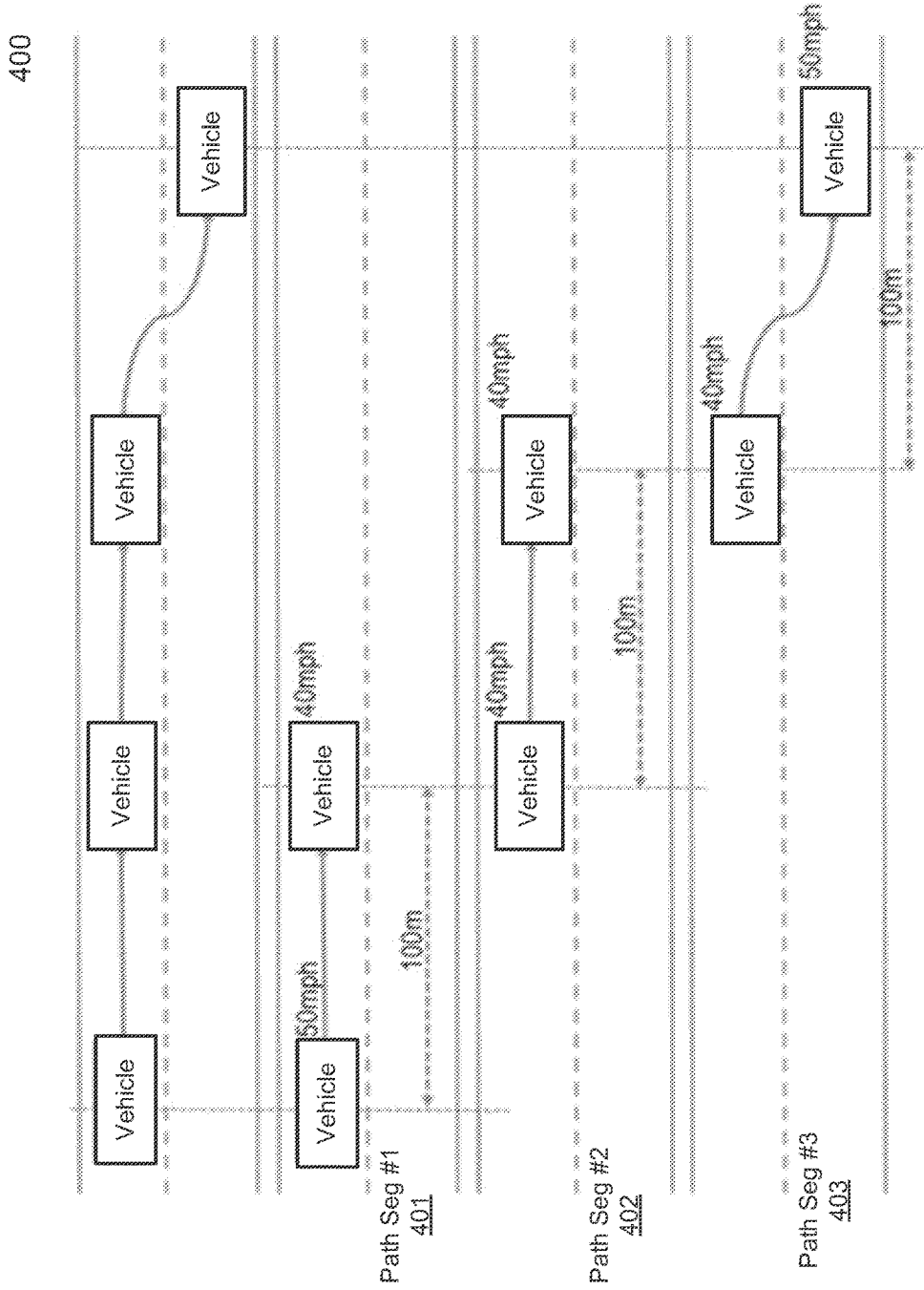
FIG. 4 is an example of a driving path that can be segmented into multiple path segments according to one embodiment of the invention.

FIG. 4 is an example of a driving path that can be segmented into multiple path segments according to one embodiment of the invention. Referring to FIG. 4, in this example, the vehicle is to decelerate from 50 mile per hour (mph) to 40 mph in 100 meters, maintain the speed of 40 mph for 100 meters, and merge to the right lane in 100 meters at 40 mph. Path/route analysis module 313 analyzes path 400 and recognizes these path segments 401-403, for example, based on the speed, acceleration, deceleration, and turning angle of changing lane at different points in time, etc. Path/route analysis module 313 may recognize these characteristics by matching a set of predetermined driving patterns or using a predetermined segmentation algorithm. For each of the path segments 401-403, analysis module 313 performs a lookup operation in driving scene database 321 to locate any possible matching driving scene and modify the driving parameters of the planning and control data corresponding to path segments 401-403.

In one embodiment, path/route analysis module 313 may match the same or similar driving parameters provided by planning module 311 against those listed in driving scene database 400 to identify a matching entry. In this example, path/route analysis module 313 may identify a first driving scene in which a vehicle decelerates from 50 mph to 40 mph in 100 meters, a second driving scene in which the vehicle maintains the same speed of 40 mph in 100 meters, and a third driving scene in which the vehicle changes to the right lane and accelerates from 40 mph to 50 mph in 100 meters. In the third driving scene, the distance between two lanes or the width of the lanes may also be taken into consideration, for example, in calculating the turning angle. Based on these three driving scenes, the preconfigured driving parameters are obtained from the matching entries of driving scene database 400. The preconfigured driving parameters may be used to replace or modify the corresponding driving parameters provided by planning module 311. The modified planning and control data is then utilized to drive the autonomous vehicle.

FIG. 5 is a block diagram illustrating an example of a driving scene database according to one embodiment of the invention. Referring to FIG. 5, data structure 500 may be implemented as part of driving scene database 321 of FIG. 3. In one embodiment, driving scene table 500 includes a number of mapping entries, each mapping entry mapping a particular driving scene 501 to a set of driving parameters or settings 502. Not that although driving scene data structure 500 is shown as a mapping table, however, it can be implemented in a variety of formats.

Figure 6:
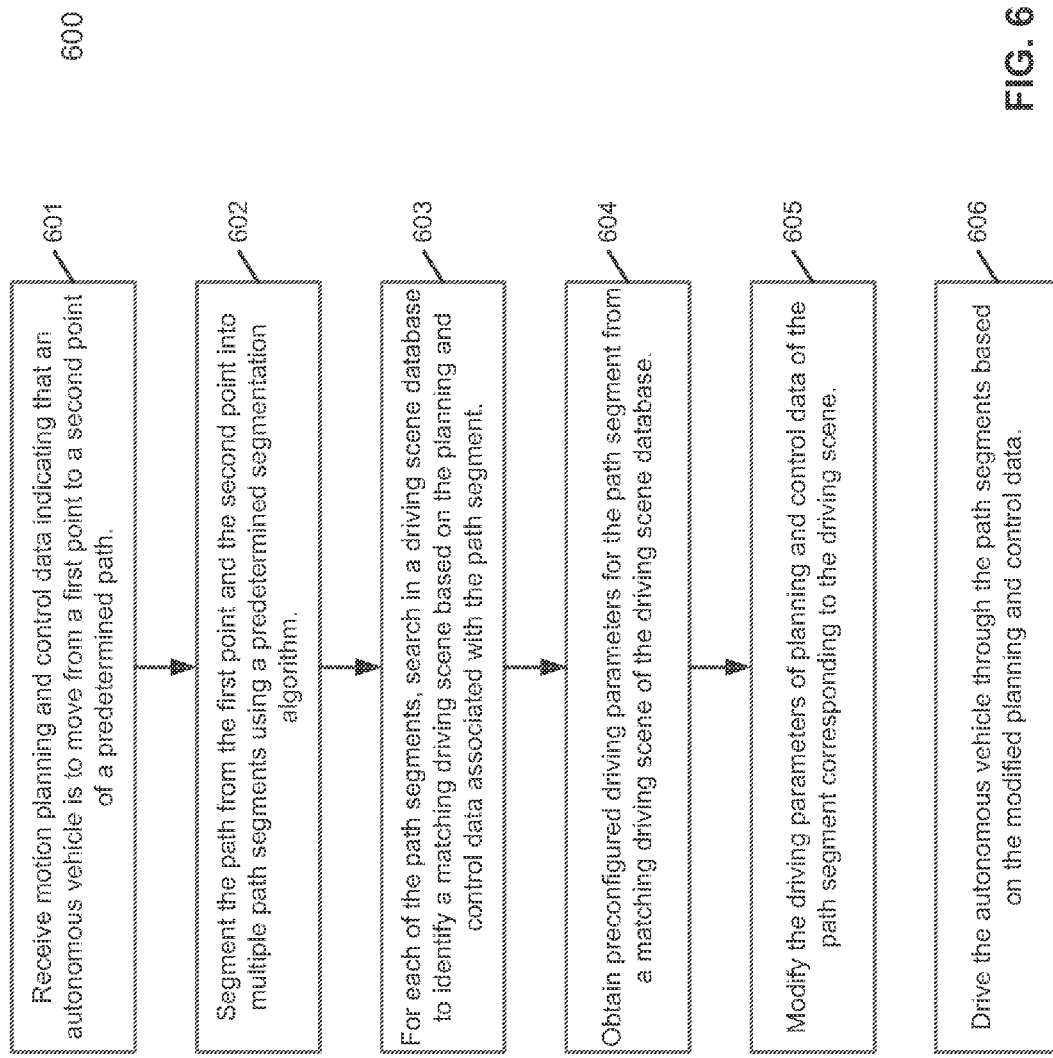
FIG. 6 is a flow diagram illustrating a process of operating an autonomous vehicle according to one embodiment of the invention.

FIG. 6 is a flow diagram illustrating a process of operating an autonomous vehicle according to one embodiment of the invention. Process 600 may be performed by processing logic that may include software, hardware, or a combination thereof. For example, process 600 may be performed by system 300 of FIG. 3. Referring to FIG. 6, at block 601, processing logic receives planning and control data, for example, from a motion planning module. The planning and control data indicates that an autonomous vehicle is to move from a first point to a second point of a path or route. At block 602, processing logic segments the path into multiple path segments (also referred to as route segments) based on metadata of planning and control data, using a path segmentation algorithm or method.

For each of the path segments, at block 603, processing logic searches in a driving scene database to identify a driving scene matching the path segment based on the planning and control data. At block 604, processing logic retrieves the preconfigured driving parameters from an entry of the driving scene database that matches the characteristics of the path segment. At block 605, processing logic replaces or modifies the driving parameters of the planning and control data corresponding to the path segment based on the preconfigured driving parameters. At block 606, processing logic transmits proper commands or instructions to a control system of the vehicle to drive the vehicle through the path segments of the path, each based on the modified driving parameters of the corresponding path segment.

Figure 7:
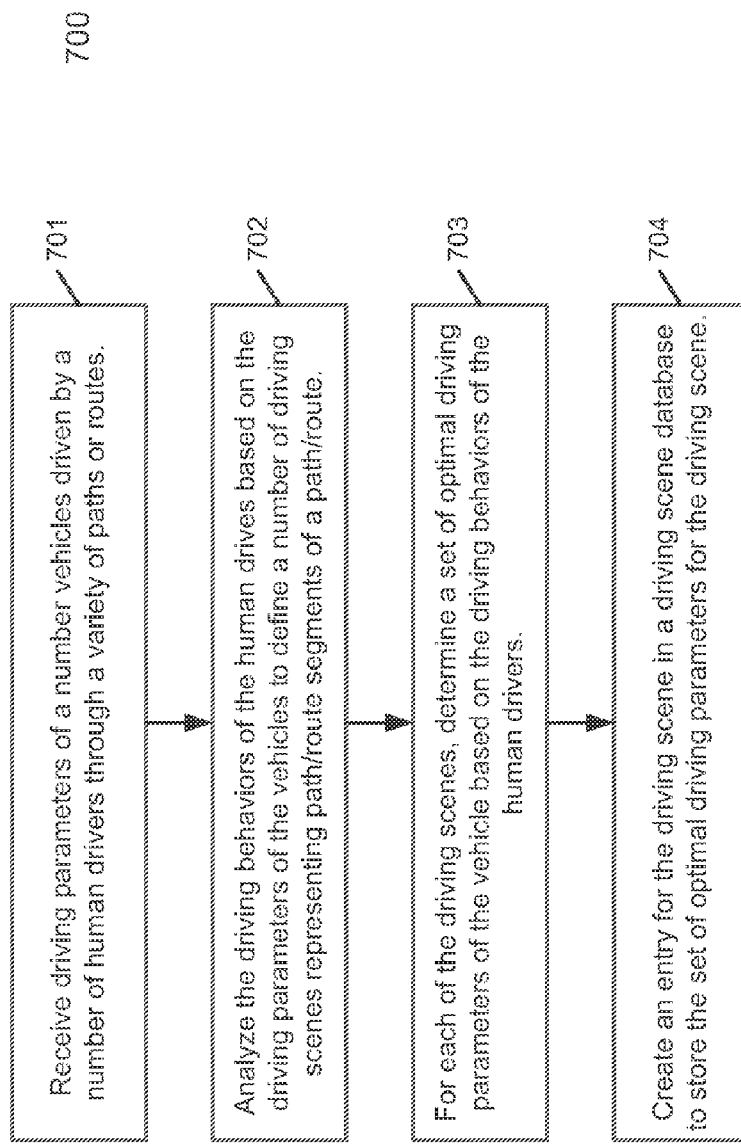
FIG. 7 is a flow diagram illustrating a process of analyzing driving statistics data of vehicles according to one embodiment of the invention.

FIG. 7 is a flow diagram illustrating a process of analyzing driving statistics data of vehicles according to one embodiment of the invention. Process 700 may be performed by processing logic that may include software, hardware, or a combination thereof. For example, process 700 may be performed by data analytics system 103 of FIG. 1. Referring to FIG. 7, at block 701, processing logic receives driving parameters of a number of vehicles driven by a number of human drivers through a number of paths or routes. The driving parameters may be monitored and collected using a variety of sensors mounted in the vehicles (e.g., speed, steering, throttle sensors, etc.). At block 702, processing logic analyzes the driving behaviors of the human drives based on the driving parameters of the vehicles to define a number of driving scenes representing path/route segments of a path/route. For each of the driving scene, at block 703, processing logic determines a set of optimal driving parameters for the driving scene based on the behaviors of the human drivers. At block 704, processing logic creates an entry for the driving scene in a driving scene database to store the set of optimal driving parameters for the corresponding driving scene. The driving scene database includes a number of entries, each entry mapping a driving scene to a set of one or more preconfigured driving parameters. The driving scene database is created specifically for the type or model of a specific vehicle. Multiple driving scene databases may be created for different types or models of different vehicles. A driving scene database may then be loaded into a corresponding type or model of an autonomous vehicle and may be periodically updated from the cloud over a network.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
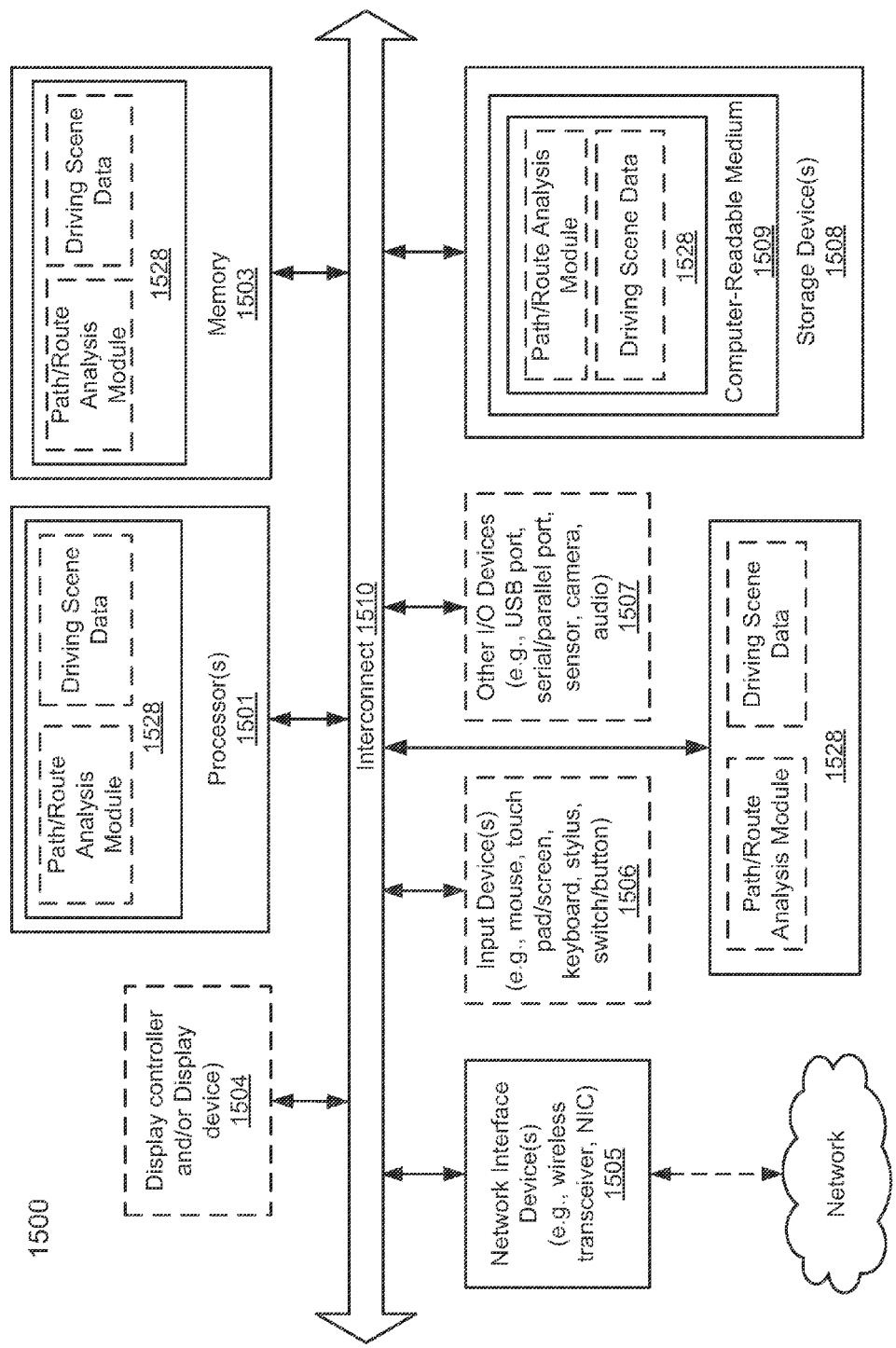
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems described above performing any of the processes or methods described above, such as, for example, data processing system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous vehicle, the method comprising:
    sensing, by a data processing system within an autonomous vehicle, a driving environment surrounding the autonomous vehicle based on sensor data obtained from a plurality of sensors mounted on the autonomous vehicle;
    generating, by a planning module within the autonomous vehicle based on sensing the driving environment, motion planning and control data to drive the autonomous vehicle from a first point to a second point of a path within a predetermined route, the motion planning and control data including information specifying driving parameters at different points in time along the path;
    segmenting, by a path analysis module hosted within the autonomous vehicle, the path from the first point to the second point into a plurality of path segments;
    for at least one of the path segments, identifying one of a plurality of predetermined driving scenes that matches motion characteristics of the corresponding path segment;
    modifying the motion planning and control data associated with the path segments based on predetermined motion settings of the plurality of path segments; and
    driving, by a control module within the autonomous vehicle, the autonomous vehicle through the path segments of the path based on the modified motion planning and control data.

2. The method of claim 1, wherein identifying one of a plurality of predetermined driving scenes that matches motion characteristics of the corresponding path segment comprises:
    searching in a driving scene database to identify a driving scene that matches characteristics of the path segment, wherein the driving scene database stores metadata describing the plurality of driving scenes that have been previous configured; and
    obtaining from the driving scene database the predetermined motion settings corresponding to the corresponding driving scene.

3. The method of claim 2, wherein the driving scene database includes a plurality of entries, each entry mapping one or more attributes representing one or more motion characteristics to a set of one or more motion settings of the autonomous vehicle.

4. The method of claim 3, wherein the motion settings comprise at least one of a throttle parameter, a braking parameter, or a steering wheel angle at different points in time within the driving scene.

5. The method of claim 3, wherein the motion settings of a driving scene specified in the driving scene database were configured based on human driving behaviors by a plurality of human drivers captured under a driving scenario similar to a path segment.

6. The method of claim 5, wherein the human driving behaviors were collected and analyzed from a plurality of vehicles having an identical or similar model as of the autonomous vehicle.

7. The method of claim 2, wherein the motion planning and control data is modified only for a path segment that matches a driving scene specified in the driving scene database, while remaining motion planning and control data is not modified.

8. A non-transitory machine-readable medium having instructions stored therein, which when executed by a processor, cause the processor to perform operations of operating an autonomous vehicle, the operations including
    sensing, by a data processing system within an autonomous vehicle, a driving environment surrounding the autonomous vehicle based on sensor data obtained from a plurality of sensors mounted on the autonomous vehicle;
    generating, by a planning module within the autonomous vehicle based on sensing the driving environment, motion planning and control data to drive autonomous vehicle from a first point to a second point of a path within a predetermined route, the motion planning and control data including information specifying driving parameters at different points in time along the path;
    segmenting, within the autonomous vehicle, the path from the first point to the second point into a plurality of path segments;
    for at least one of the path segments, identifying one of a plurality of predetermined driving scenes that matches motion characteristics of the corresponding path segment;
    modifying the motion planning and control data associated with the path segments based on predetermined motion settings of the plurality of path segments; and
    driving, by a control module within the autonomous vehicle, the autonomous vehicle through the path segments of the path based on the modified motion planning and control data.

9. The machine-readable medium of claim 8, wherein identifying one of a plurality of predetermined driving scenes that matches motion characteristics of the corresponding path segment comprises:
    searching in a driving scene database to identify a driving scene that matches characteristics of the path segment, wherein the driving scene database stores metadata describing the plurality of driving scenes that have been previous configured; and
    obtaining from the driving scene database the predetermined motion settings corresponding to the corresponding driving scene.

10. The machine-readable medium of claim 9, wherein the driving scene database includes a plurality of entries, each entry mapping one or more attributes representing one or more motion characteristics to a set of one or more motion settings of the autonomous vehicle.

11. The machine-readable medium of claim 10, wherein the motion settings comprise at least one of a throttle parameter, a braking parameter, or a steering wheel angle at different points in time within the driving scene.

12. The machine-readable medium of claim 10, wherein the motion settings of a driving scene specified in the driving scene database were configured based on human driving behaviors by a plurality of human drivers captured under a driving scenario similar to a path segment.

13. The machine-readable medium of claim 12, wherein the human driving behaviors were collected and analyzed from a plurality of vehicles having an identical or similar model as of the autonomous vehicle.

14. The machine-readable medium of claim 9, wherein the motion planning and control data is modified only for a path segment that matches a driving scene specified in the driving scene database, while remaining motion planning and control data is not modified.

15. A data processing system, comprising:
a processor; and
a memory coupled to the processor for storing instructions, which when executed by the processor, cause the processor to perform operations of operating an autonomous vehicle, the operations including:
sensing a driving environment surrounding the autonomous vehicle based on sensor data obtained from a plurality of sensors mounted on the autonomous vehicle;
generating, based on sensing the driving environment, motion planning and control data to drive the autonomous vehicle from a first point to a second point of a path within a predetermined route, the motion planning and control data including information specifying driving parameters at different points in time along the path,
segmenting, within the autonomous vehicle, the path from the first point to the second point into a plurality of path segments,
for at least one of the path segments, identifying one of a plurality of predetermined driving scenes that matches motion characteristics of the corresponding path segment,
modifying the motion planning and control data associated with the path segments based on predetermined motion settings of the plurality of path segments, and
driving the autonomous vehicle through the path segments of the path based on the modified motion planning and control data.

16. The system of claim 15, wherein identifying one of a plurality of predetermined driving scenes that matches motion characteristics of the corresponding path segment comprises:
searching in a driving scene database to identify a driving scene that matches characteristics of the path segment, wherein the driving scene database stores metadata describing the plurality of driving scenes that have been previous configured; and
obtaining from the driving scene database the predetermined motion settings corresponding to the corresponding driving scene.

17. The system of claim 16, wherein the driving scene database includes a plurality of entries, each entry mapping one or more attributes representing one or more motion characteristics to a set of one or more motion settings of the autonomous vehicle.

18. The system of claim 17, wherein the motion settings comprise at least one of a throttle parameter, a braking parameter, or a steering wheel angle at different points in time within the driving scene.

19. The system of claim 17, wherein the motion settings of a driving scene specified in the driving scene database were configured based on human driving behaviors by a plurality of human drivers captured under a driving scenario similar to a path segment.

20. The system of claim 19, wherein the human driving behaviors were collected and analyzed from a plurality of vehicles having an identical or similar model as of the autonomous vehicle.

21. The system of claim 16, wherein the motion planning and control data is modified only for a path segment that matches a driving scene specified in the driving scene database, while remaining motion planning and control data is not modified.

* * * * *